US009003558B1

(12) United States Patent
Dorwin et al.

(10) Patent No.: US 9,003,558 B1
(45) Date of Patent: Apr. 7, 2015

(54) ALLOWING DEGRADED PLAY OF PROTECTED CONTENT USING SCALABLE CODECS WHEN KEY/LICENSE IS NOT OBTAINED (75) Inventors: David Kimbal Dorwin, Kirkland, WA (US); Aaron James Colwell, Seattle, WA (US); Andrew Martin Scherkus, Seattle, WA (US); Francis Galligan, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/553,630

(22) Filed: Jul. 19, 2012

Related U.S. Application Data (60) Provisional application No. 61/569,755, filed on Dec. 12, 2011.

(51) Int. Cl.
*H04L 29/06* (2006.01)
(52) U.S. Cl.
CPC .................................. *H04L 29/0632* (2013.01)
(58) Field of Classification Search
USPC .......................................................... 726/30
See application file for complete search history.

(56) References Cited

U.S. PATENT DOCUMENTS

| | | |
|---|---|---|
| 4,535,355 A | 8/1985 | Arn et al. |
| 4,694,489 A | 9/1987 | Frederiksen |
| 5,067,035 A | 11/1991 | Kudelski et al. |
| 5,134,656 A | 7/1992 | Kudelski |
| 5,144,663 A | 9/1992 | Kudelski et al. |
| 5,191,611 A | 3/1993 | Lang |
| 5,339,413 A | 8/1994 | Koval et al. |
| 5,375,168 A | 12/1994 | Kudelski |
| 5,392,351 A | 2/1995 | Hasebe et al. |
| 5,487,167 A | 1/1996 | Dinallo et al. |
| 5,539,450 A | 7/1996 | Handelman |
| 5,590,200 A | 12/1996 | Nachman et al. |
| 5,592,212 A | 1/1997 | Handelman |
| 5,621,799 A | 4/1997 | Katta et al. |
| 5,640,546 A | 6/1997 | Gopinath et al. |
| 5,666,412 A | 9/1997 | Handelman et al. |
| 5,684,876 A | 11/1997 | Pinder et al. |

(Continued)

FOREIGN PATENT DOCUMENTS

| | | |
|---|---|---|
| EP | 0658054 A2 | 6/1995 |
| EP | 0714204 A2 | 5/1996 |

(Continued)

OTHER PUBLICATIONS

Official Communication for U.S. Appl. No. 13/437,789 mailed Mar. 26, 2013.

(Continued)

*Primary Examiner* — Bradley Holder
(74) *Attorney, Agent, or Firm* — Byrne Poh LLP (57) ABSTRACT

Embodiments are directed towards enabling a portion of a protected content stream to be played in a degraded quality or experience at a client device when a key and/or license for some other portion of the content stream is unobtainable, or is not obtained by the client device. A content stream has a plurality of layers, with a baseline layer having a lowest quality level of the plurality of layers that is unencrypted, while at least one other layer is encrypted. When the key to decrypt the encrypted layer(s) is unobtained, at least the baseline unencrypted layer is allowed to still play at the client device.

17 Claims, 5 Drawing Sheets

(56) References Cited

U.S. PATENT DOCUMENTS

| | | | |
|---|---|---|---|
| 5,758,257 A | 5/1998 | Herz et al. | |
| 5,774,527 A | 6/1998 | Handelman et al. | |
| 5,774,546 A | 6/1998 | Handelman et al. | |
| 5,799,089 A | 8/1998 | Kuhn et al. | |
| 5,805,705 A | 9/1998 | Gray et al. | |
| 5,870,474 A | 2/1999 | Wasilewski et al. | |
| 5,878,134 A | 3/1999 | Handelman et al. | |
| 5,883,957 A | 3/1999 | Moline et al. | |
| 5,892,900 A | 4/1999 | Ginter et al. | |
| 5,910,987 A | 6/1999 | Ginter et al. | |
| 5,915,019 A | 6/1999 | Ginter et al. | |
| 5,917,912 A | 6/1999 | Ginter et al. | |
| 5,920,625 A | 7/1999 | Davies | |
| 5,920,861 A | 7/1999 | Hall et al. | |
| 5,922,208 A | 7/1999 | Demmers | |
| 5,923,666 A | 7/1999 | Gledhill et al. | |
| 5,933,498 A | 8/1999 | Schneck et al. | |
| 5,939,975 A | 8/1999 | Tsuria et al. | |
| 5,943,422 A | 8/1999 | Van Wie et al. | |
| 5,949,876 A | 9/1999 | Ginter et al. | |
| 5,982,891 A | 11/1999 | Ginter et al. | |
| 5,991,399 A | 11/1999 | Graunke et al. | |
| 6,009,116 A | 12/1999 | Bednarek et al. | |
| 6,009,401 A | 12/1999 | Horstmann | |
| 6,009,525 A | 12/1999 | Horstmann | |
| 6,021,197 A | 2/2000 | von Willich et al. | |
| 6,035,037 A | 3/2000 | Chaney | |
| 6,038,433 A | 3/2000 | Vegt | |
| 6,049,671 A | 4/2000 | Slivka et al. | |
| 6,055,503 A | 4/2000 | Horstmann | |
| 6,073,256 A | 6/2000 | Sesma | |
| 6,112,181 A | 8/2000 | Shear et al. | |
| 6,138,119 A | 10/2000 | Hall et al. | |
| 6,141,753 A | 10/2000 | Zhao et al. | |
| 6,157,721 A | 12/2000 | Shear et al. | |
| 6,160,891 A | 12/2000 | Al-Salqan | |
| 6,178,242 B1 | 1/2001 | Tsuria | |
| 6,185,683 B1 | 2/2001 | Ginter et al. | |
| 6,189,097 B1 | 2/2001 | Tycksen, Jr. et al. | |
| 6,191,782 B1 | 2/2001 | Mori et al. | |
| 6,226,618 B1 | 5/2001 | Downs et al. | |
| 6,226,794 B1 | 5/2001 | Anderson, Jr. et al. | |
| 6,237,786 B1 | 5/2001 | Ginter et al. | |
| 6,240,185 B1 | 5/2001 | Van Wie et al. | |
| 6,247,950 B1 | 6/2001 | Hallam et al. | |
| 6,253,193 B1 | 6/2001 | Ginter et al. | |
| 6,256,668 B1 | 7/2001 | Slivka et al. | |
| 6,272,636 B1 | 8/2001 | Neville et al. | |
| 6,285,985 B1 | 9/2001 | Horstmann | |
| 6,292,569 B1 | 9/2001 | Shear et al. | |
| 6,298,441 B1 | 10/2001 | Handelman et al. | |
| 6,311,221 B1 | 10/2001 | Raz et al. | |
| 6,314,409 B2 | 11/2001 | Schneck et al. | |
| 6,314,572 B1 | 11/2001 | LaRocca et al. | |
| 6,334,213 B1 | 12/2001 | Li | |
| 6,363,488 B1 | 3/2002 | Ginter et al. | |
| 6,385,596 B1 | 5/2002 | Wiser et al. | |
| 6,389,402 B1 | 5/2002 | Ginter et al. | |
| 6,405,369 B1 | 6/2002 | Tsuria | |
| 6,409,080 B2 | 6/2002 | Kawagishi | |
| 6,409,089 B1 | 6/2002 | Eskicioglu | |
| 6,415,031 B1 | 7/2002 | Colligan et al. | |
| 6,427,140 B1 | 7/2002 | Ginter et al. | |
| 6,449,367 B2 | 9/2002 | Van Wie et al. | |
| 6,449,719 B1 | 9/2002 | Baker | |
| 6,459,427 B1 | 10/2002 | Mao et al. | |
| 6,466,670 B1 | 10/2002 | Tsuria et al. | |
| 6,505,299 B1 | 1/2003 | Zeng et al. | |
| 6,587,561 B1 | 7/2003 | Sered et al. | |
| 6,618,484 B1 | 9/2003 | Van Wie et al. | |
| 6,629,243 B1 | 9/2003 | Kleinman et al. | |
| 6,633,918 B2 | 10/2003 | Agarwal et al. | |
| 6,634,028 B2 | 10/2003 | Handelman | |
| 6,640,304 B2 | 10/2003 | Ginter et al. | |
| 6,651,170 B1 | 11/2003 | Rix | |
| 6,654,420 B1 | 11/2003 | Snook | |
| 6,654,423 B2 | 11/2003 | Jeong et al. | |
| 6,658,568 B1 | 12/2003 | Ginter et al. | |
| 6,668,325 B1 | 12/2003 | Collberg et al. | |
| 6,792,113 B1 | 9/2004 | Ansell et al. | |
| 7,007,170 B2 | 2/2006 | Morten | |
| 7,165,175 B1 | 1/2007 | Kollmyer et al. | |
| 7,356,143 B2 | 4/2008 | Morten | |
| 7,640,435 B2 | 12/2009 | Morten | |
| 7,805,616 B1 | 9/2010 | Mohammed et al. | |
| 7,814,154 B1 * | 10/2010 | Kandekar et al. | 709/205 |
| 7,817,608 B2 | 10/2010 | Rassool et al. | |
| 7,953,882 B2 | 5/2011 | Shukla et al. | |
| 8,687,114 B2 * | 4/2014 | Bennett | 348/441 |
| 8,787,454 B1 * | 7/2014 | Chechik et al. | 375/240.08 |
| 2002/0001385 A1 | 1/2002 | Kawada et al. | |
| 2002/0015498 A1 | 2/2002 | Houlberg et al. | |
| 2002/0021805 A1 | 2/2002 | Schumann et al. | |
| 2002/0049679 A1 | 4/2002 | Russell et al. | |
| 2002/0065844 A1 | 5/2002 | Robinson et al. | |
| 2002/0089410 A1 | 7/2002 | Janiak et al. | |
| 2002/0104004 A1 | 8/2002 | Couillard | |
| 2002/0141582 A1 | 10/2002 | Kocher et al. | |
| 2002/0170053 A1 * | 11/2002 | Peterka et al. | 725/31 |
| 2003/0007568 A1 | 1/2003 | Hamery et al. | |
| 2003/0016949 A1 * | 1/2003 | Unger | 386/94 |
| 2003/0046568 A1 | 3/2003 | Riddick et al. | |
| 2004/0028227 A1 * | 2/2004 | Yu | 380/201 |
| 2004/0031856 A1 | 2/2004 | Atsmon et al. | |
| 2004/0093396 A1 * | 5/2004 | Akune | 709/219 |
| 2004/0117500 A1 | 6/2004 | Lindholm et al. | |
| 2004/0151315 A1 | 8/2004 | Kim | |
| 2004/0184616 A1 | 9/2004 | Morten | |
| 2004/0196972 A1 * | 10/2004 | Zhu et al. | 380/45 |
| 2005/0066353 A1 | 3/2005 | Fransdonk | |
| 2005/0125358 A1 | 6/2005 | Levin et al. | |
| 2005/0193205 A1 | 9/2005 | Jacobs et al. | |
| 2005/0273862 A1 | 12/2005 | Benaloh et al. | |
| 2006/0020811 A1 | 1/2006 | Tan | |
| 2006/0204115 A1 * | 9/2006 | Burazerovic | 382/239 |
| 2006/0212363 A1 | 9/2006 | Peinado et al. | |
| 2006/0280150 A1 | 12/2006 | Jha et al. | |
| 2007/0160208 A1 | 7/2007 | MacLean et al. | |
| 2007/0209005 A1 | 9/2007 | Shaver et al. | |
| 2007/0219917 A1 | 9/2007 | Liu et al. | |
| 2007/0294170 A1 | 12/2007 | Vantalon et al. | |
| 2008/0027871 A1 | 1/2008 | Seo | |
| 2008/0147671 A1 | 6/2008 | Simon et al. | |
| 2008/0155673 A1 | 6/2008 | Jung et al. | |
| 2008/0313264 A1 | 12/2008 | Pestoni | |
| 2009/0007198 A1 | 1/2009 | Lavender et al. | |
| 2009/0031408 A1 | 1/2009 | Thom et al. | |
| 2009/0044008 A1 | 2/2009 | Lim | |
| 2009/0147854 A1 * | 6/2009 | Dane et al. | 375/240.16 |
| 2009/0183001 A1 | 7/2009 | Lu et al. | |
| 2009/0185073 A1 * | 7/2009 | Macinnis et al. | 348/448 |
| 2009/0208016 A1 | 8/2009 | Choi et al. | |
| 2009/0249426 A1 | 10/2009 | Aoki et al. | |
| 2010/0023760 A1 | 1/2010 | Lee et al. | |
| 2010/0027974 A1 | 2/2010 | Ansari | |
| 2010/0145794 A1 | 6/2010 | Barger et al. | |
| 2010/0180289 A1 | 7/2010 | Barsook et al. | |
| 2010/0211776 A1 | 8/2010 | Gunaseelan et al. | |
| 2010/0242079 A1 * | 9/2010 | Riedl et al. | 725/115 |
| 2010/0242097 A1 | 9/2010 | Hotes et al. | |
| 2010/0299701 A1 | 11/2010 | Liu et al. | |
| 2011/0131664 A1 * | 6/2011 | Jonsson | 726/28 |
| 2011/0179283 A1 | 7/2011 | Thom et al. | |
| 2011/0194713 A1 * | 8/2011 | Apfel et al. | 381/314 |
| 2011/0225417 A1 | 9/2011 | Maharajh et al. | |
| 2011/0274179 A1 * | 11/2011 | Holden | 375/240.25 |
| 2011/0314284 A1 | 12/2011 | Chou | |
| 2012/0066494 A1 | 3/2012 | Lee et al. | |
| 2012/0117183 A1 | 5/2012 | Wong et al. | |
| 2012/0173884 A1 | 7/2012 | Patil | |
| 2012/0317414 A1 | 12/2012 | Glover | |
| 2012/0331293 A1 | 12/2012 | Ma et al. | |

(56) References Cited

U.S. PATENT DOCUMENTS

| | | | |
|---|---|---|---|
| 2013/0072126 | A1 | 3/2013 | Topaltzas et al. |
| 2013/0097302 | A9 | 4/2013 | Khedouri et al. |

FOREIGN PATENT DOCUMENTS

| | | | |
|---|---|---|---|
| EP | 0852445 | A2 | 7/1998 |
| EP | 0886409 | A2 | 12/1998 |
| EP | 1134977 | A1 | 9/2001 |
| EP | 1246463 | A2 | 10/2002 |
| JP | 03203432 | A | 9/1991 |
| JP | 08335040 | A | 12/1996 |
| JP | 10336128 | A | 12/1998 |
| JP | 11175475 | A | 7/1999 |
| JP | 2000022680 | A | 1/2000 |
| JP | 2000196585 | A | 7/2000 |
| JP | 2000293945 | A | 10/2000 |
| JP | 2001251599 | A | 9/2001 |
| WO | 96/06504 | A1 | 2/1996 |
| WO | 96/32702 | A1 | 10/1996 |
| WO | 99/21364 | A1 | 4/1999 |
| WO | 99/28842 | A1 | 6/1999 |
| WO | 99/30499 | A1 | 6/1999 |
| WO | 99/54453 | A1 | 10/1999 |
| WO | 01/35571 | A1 | 5/2001 |
| WO | 01/93212 | A2 | 12/2001 |
| WO | 02/21761 | A2 | 3/2002 |
| WO | 2004/002112 | A1 | 12/2003 |

OTHER PUBLICATIONS

Official Communication for U.S. Appl. No. 13/586,664, mailed Jun. 20, 2013.

"Digital rights management," Wikipedia, the free encyclopedia, last modified Mar. 30, 2012, 30 pages http://en.wikipedia.org/w/index.php?title=Digital_rights_management&printable=yes.

"Establishing Interconnectivity among Various Makers' Products through Standardization of VOD Protocol", NTT Corporation Press Release, Sep. 27, 2002 http://www.ntt.co.jp/news/news02e/0209/020927.html.

"High-bandwidth Digital Content Protection," Wikipedia, the free encyclopedia, last modified Nov. 14, 2012, 7 pages http://en.wikipedia.org/w/index.php?title=High-bandwidth_Digital_Content_Protection&printable=yes "Intelligent Systems for Finance and Business," Goonatilake, S. et al., eds., Chapters 2-10, 1995, pp. 31-173.

"Irdeto Access and Optibase create Strategic Alliance", Press Release, Irdeto Access, Dec. 14, 2000 pp. 1-4 http://www.irdetoaccess.com/press/0000041.htm.

"Irdeto Access and Optibase create Strategic Alliance", Press Release, Optibase, Dec. 14, 2000, pp. 1-2 http://www.optibase.com/html/news/December_14_2000.html.

"PlayReady," Wikipedia, the free encyclopedia, last modified Jan. 30, 2012, 2 pages http://en.wikipedia.org/w/index.php?title=PlayReady&printable=yes.

"Scalable Video Coding," Wikipedia, the free encyclopedia, last modified Sep. 10, 2012, 4 pages http://en.wikipedia.org/w/index.php?title=Scalable_Video_Coding&printable=yes.

"UltraViolet (system)," Wikipedia, the free encyclopedia, last modified Feb. 20, 2012, 5 pages http://en.wikipedia.org/w/index.php?title=UltraViolet_(system)&printable=yes.

"What is HDCP (high definition copy protocol)?" Digital Connection, 2005, 2 pages http://www.digitalconnection.com/FAQ/HDTV_12.asp.

Balthrop, J. et al., "Coverage and Generalization in an Artificial Immune System", Proceedings of Genetic and Evolutionary Computation Conference (GECCO), 2002, pp. 1-8.

Blumenfeld, S. M., "Streaming Media—System Security," Broadcast Engineering Magazine, Oct. 2001, pp. 1-2.

Canadian Examiner Report for Application No. 2,559,323 mailed May 6, 2008, 3 pages.

Cheng, H. C. H., "Partial Encryption for Image and Video Communication", Department of Computing Science, University of Alberta, Fall 1998, pp. 1-87.

Cheng, H. et al., "Partial Encryption of Compressed Images and Videos", IEEE Transactions on Signal Processing, vol. 48, No. 8, Aug. 2000, pp. 2439-2451.

Deitcher, D., "Secure Implementations of Content Protection (DRM) Schemes on Consumer Electronic Devices," Discretix, White Paper, May 2011, 17 pages.

Eskicioglu, A. M. et al., "An Overview of Multimedia Content Protection in Consumer Electronics Devices", SP:IC, vol. 16 No. 7, Apr. 2001, pp. 681-699.

Ferrill, E. et al., "A Survey of Watermarking", Feb. 25, 1999, 15 pages http://elizabeth.ferrill.com/papers/watermarking.pdf.

Forrest, S., "Research Projects," Dec. 2, 2003, pp. 1-3 http://www.cs.unm.edu/.about.forrest/projects.html.

Goodman, J. et al., "Low Power Scalable Encryption for Wireless Systems", Wireless Networks, No. 4, 1998, pp. 55-70.

Griwodz, C. et al., "Protecting VoD the Easier Way", ACM Multimedia, Bristol, UK, Jan. 1998, pp. 21-28.

Griwodz, C., "Video Protection by Partial Content Corruption", Multimedia and Security Workshop at ACM Muitimedia, Bristol, UK, Sep. 1998, pp. 1-5.

Hunter, J., et al., "A Review of Video Streaming Over the Internet", DSTC Technical Report TR97-10, Aug. 1997, pp. 1-28.

International Search Report and Written Opinion for international Patent Application No. PCT/US07/62055 mailed Sep. 11, 2007.

Kirovski, D. et al, "Digital Rights Management for Digital Cinema", Proceedings of the SPIE, Bellingham, VA, vol. 4472, Jul. 31, 2001, p. 105-120.

Office Action for European Patent Application No. 05260968.4 mailed Jan. 26, 2006.

Official Communication for Chinese Patent Application No. 2004800071571 mailed Apr. 13, 2007.

Official Communication for European Patent Application No. 04757582.4 mailed May 22, 2007.

Omneon Video Networks Product Announcement, "Broadband Streaming—Omneon and BSkyB", TB-1006-1, created 2002, pp. 1-4.

Schulzrinne, H., et al., "Real Time Streaming Protocol (RTSP)," RFC 2326, Apr. 1998, pp. 1-86.

Schulzrinne, H., et al., "RTP: A Transport Protocol for Real-Time Applications", RFC 1889, Jan. 1996, pp. 1-75.

Search Report for European Patent Application No. 05250968.4 mailed Oct. 12, 2005.

Spanos, G. et al., "Performance Study of a Selective Encryption Scheme for the Security of Networked, Real-Time Video", Proceedings of the Fourth International Conference on Computer Communications and Networks, ICCCN '95, Las Vegas, NV, Sep. 1995, pp. 2-10.

Supplementary European Search Report for European Patent Application No. 00986215 dated Nov. 14, 2005.

Supplementary European Search Report for European Patent Application No. 04757582.4 mailed Nov. 20, 2006.

Colwell, A., "Proposal for a MediaSource API that allows sending media data to a HTMLMediaElement," Jul. 11, 2011, pp. 1-11 http://lists.whatwg.org/pipermail/whatwg-whatwg.org/2011-July/032384.html.

Official Communication for U.S. Appl. No. 13/437,789 mailed Nov. 13, 2013.

Official Communication for U.S. Appl. No. 13/532,734 mailed Oct. 23, 2013.

Official Communication for U.S. Appl. No. 13/654,271 mailed Oct. 24, 2013.

Official Communication for U.S. Appl. No. 13/654,237 mailed Oct. 23, 2013.

Official Communication for U.S. Appl. No. 13/712,764 mailed Nov. 7, 2013.

"A new approach to browser security: the Google Chrome Sandbox," Chromium Blog, http://blog.chromium.org/2008/10/new-approach-to-browser-security-google.html, 5 pages, Oct. 2, 2008.

(56) References Cited

OTHER PUBLICATIONS

"Conditional access," Wikipedia, the free encyclopedia, http://en.wikipedia.org/wiki/Conditional_access, 8 pages, created Jul. 7, 2005.
"Encrypted Media Extensions, W3C Editor's Draft Dec. 17, 2012," W3C, http://dvcs,w3.org/hg/html-media/raw-file/tip/encrypted-media/encrypted-media.html, 32 pages, created Feb. 22, 2012, current draft dated Dec. 17, 2012.
"Getting Started: Background and Basics—The Chromium Projects," http://chromium.org/nativeclient/getting-started/getting-started-background-and-basics, 4 pages, Sep. 2, 2008.
"Google Native Client," Wikipedia, the free encyclopedia, http://en.wikipedia.org/wiki/Google_Native_Client, 6 pages, created Dec. 9, 2008.
"HTML5," Wikipedia, the free encyclopedia, http://en.wikipedia.org/wiki/HTML5, 9 pages, created Nov. 16, 2006.
"Media Source Extensions; W3C Editor's Draft Dec. 18, 2012," http://dvcs.w3.org/hg/html-media/raw-file/tip/media-source/media-source.html, 25 pages, created Jul. 11, 2011, current draft dated Dec. 18, 2012.
"Media Source Extensions," http://html5-mediasource-api.googlecode.com/svn/trunk/draft-spec/mediasource-draft-spec.html, 1 page, Jul. 11, 2011.
"MediaSource Extensions v0.3," editor A. Colwell, http://html5-mediasource-api.googlecode.com/svn/tags/0.3/draft-spec/mediasource-draft-spec.html, 14 pages, Mar. 13, 2012.
"Multimedia over Coax Alliance," Wikipedia, the free encyclopedia, http://en.wikipedia.org/wiki/Multimedia_over_Coax_Alliance, 4 pages, created Jun. 11, 2006.
"Sandbox—The Chromium Projects," http://dev.chromium.org/developers/design-documents/sandbox, 8 pages, Sep. 2, 2008.
"W3C HTML Working Group," http://www.w3.org/html/wg, 9 pages, May 9, 2007.
"Web Cryptography Working Group Chatter," W3C Technology and Society domain, http://www.w3.org/2011/11/webcryptography-charter.html, 6 pages, Apr. 3, 2012.
Barth, A. et al., "The Security Architecture of the Chromium Browser," Technical Report, Stanford University, 2008.
Glazkov, D., "What the Heck is Shadow DOM?," http://glazkov.com/2011/01/14/what-the-heck-is-shadow-dom, 14 pages, Jan. 14, 2011.
Metz, C., "Google Native Client: The web of the future—or the past?" The Register, http://www.theregister.co.uk/2011/09/12/google_native_client_from_all_sides/print.html, 13 pages, Sep. 12, 2011.
Yee, B. et al., "Native Client: A Sandbox for Portable, Untrusted x86 Native Code," IEEE Symposium on Security and Privacy, Oakland 2009, 15 pages, May 16-19, 2009.
Official Communication for U.S. Appl. No. 13/437,789 mailed Aug. 14, 2013.
Official Communication for U.S. Appl. No. 13/586,664 mailed Dec. 26, 2013.
Teixeira, L. M, et al, "Secure Transmission of MPEG Video Sources", Proceedings of IEEE Workshop on ISPACS, Nov. 6, 1998, pp. 1-5.
Wu, T.-L. et al., "Selective Encryption and Watermarking of MPEG Video (Extended Abstract)", submitted to International Conference on Image Science, Systems, and Technology, Feb. 17, 1997, 10 pages.
Yoshida, K. et al., "A Continuous-Media Communication Method for Minimizing Playback Interruptions", IS&T/SPIE Conference on Visual Communications and Image Processing, San Jose, California, vol. 3653, Jan. 1999, 10 pages.
Zhang, J. et al., "A Flexible Content Protection System for Media-On-Demand", Proceedings of the Fourth International Symposium on Multimedia Software Engineering 2002, Dec. 11-13, 2002, Piscataway, NJ, Dec. 11, 2002, pp. 272-277.

* cited by examiner

ALLOWING DEGRADED PLAY OF PROTECTED CONTENT USING SCALABLE CODECS WHEN KEY/LICENSE IS NOT OBTAINED

CROSS-REFERENCE TO RELATED APPLICATION

This application is a utility patent application based on previously filed U.S. Provisional Patent Application Ser. No. 61/569,755 filed on Dec. 12, 2011, the benefit of which is hereby claimed under 35 U.S.C. §119(e) and incorporated herein by reference.

TECHNICAL FIELD

The present embodiments relate generally to managing play of protected digital content and, more particularly, but not exclusively, to allowing access and play of a content stream in a degraded quality or experience when a key or license for at least some of the content stream is not obtainable.

BACKGROUND

Movies, music, and other forms of digital content are provided to our computers over the Internet virtually everyday. We receive news, education, and entertainment, as well as many other forms of digital content. For a variety of reasons, some of this content is protected. Such protections may take the form of requiring a license that at least identifies various rights to use, play, copy, and/or distribute the associated content. Other protections may include various levels or types of encryption protection that may necessitate a key in order to decrypt the content. However, for any of a variety of reasons, the key and/or a license providing access and rights to play the content might be unavailable. The consumer might then be unable to play the content, resulting in frustration, and possible lose of income to the content provider. It is with respect to these considerations and others that the present invention has been made.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present embodiments, reference will be made to the following Detailed Description, which is to be read in association with the accompanying drawings, in which.

DETAILED DESCRIPTION

The present embodiments now will be described more fully hereinafter with reference to the accompanying drawings, which form a part hereof, and which show, by way of illustration, specific aspects in which the embodiments may be practiced. These embodiments may, however, take many different forms and should not be construed as limited to the embodiments set forth herein; rather, these embodiments are provided so that this disclosure will be thorough and complete, and will fully convey the scope to those skilled in the art. Among other things, the present embodiments may include methods or devices. Accordingly, the present embodiments may take the form of entirely hardware or a combination of software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "content" includes any digital data that may be communicated over a network to be remotely played by a computing device. Non-exhaustive examples of content include but are not limited to movies, videos, music, spoken word, pictures, illustrations, graphics, images, text, and the like. Content is often described by its format, or container, in which the content is provided. Thus, as used here, the term "container" refers to a data stream or file format which encapsulates audio and visual content. This content often consists of interleaved audio and video data in frames, with accompanying metadata such as frame timing information, audio and/or video configuration information, encoding information, compression information, and the like. Also, the container is typically arranged to enable content to be presented for playback at a remotely located network device, such as a client device. A container may also be named a "systems stream" or "content stream". A non-limiting and non-exhaustive list of examples of container/system/content stream formats are: MPEG2-TS (Moving Picture Experts Group ("MPEG") transport stream ("TS")), flash video ("FLY"), MOV (a QuickTime file format), MP4, 3GP, and ASF (Advanced Systems Form), WebM Project file format, Matroska multimedia container format, or the like. A video encoding format, such as H.264, VP8, or the like, may be encapsulated in the container. The content may be distributed as a digitally rights managed (DRM) systems stream of data over a network such as Pay per View (PPV), Video On Demand (VoD), live streaming, or the like for playback by a remote network device. In one embodiment, the content may be protected through a license that describes how, where, when, by whom, or so forth, content that is protected may be accessed, distributed, copied, or the like. Protected content may be protected using a variety of content protection mechanisms.

As used herein, the term "streaming digital content" refers to digital content constantly received by and prepared for presentation for play at a client device while being delivered by a provider, typically over a network such as the Internet. With streaming, the client device can start playing the digital content before the entire content stream has been transmitted to/received by the client device.

As used herein, encryption refers to the process of transforming digital content (referred to as plaintext) using an algorithm (called a cipher) to make it unreadable to anyone except those possessing special knowledge, usually referred to as a key. Decryption is the process of converting encrypted digital content back into its original form. As used herein, "unencrypted" digital content refers to digital content received in plaintext—or is otherwise not encrypted, and therefore does not need to be decrypted. It should be understood such plaintext digital content, may be received, in at least one embodiment, in a compressed form, or encoded form, and still be considered as plaintext for the purposes described herein. Moreover, as discussed further below, digital content may include portions that are encrypted, and other portions that are unencrypted within a same stream of digital content. Further, different encrypted portions of the stream of digital content may be encrypted using different encryption keys, and/or employ different licenses. In one embodiment, keys usable for decrypted the differently encrypted digital content may be rotated, reused, or renegotiated.

As used herein, the term "quality" of content (or quality of play—of content) refers to at least one of a spatial resolution, temporal resolution, a video feature, an audio feature, a bit rate, or a dimensional feature that affects how the content is played, including any one or more of how it is displayed, sounds, or otherwise is visually and/or audibly perceived. For example, a spatial feature may include a picture size or scalability feature of the content. That is video components of the content may be coded based on a selected spatial resolution to provide less or more resolution. Similarly, a temporal or frame rate quality affects such features as motion compensation dependencies with the content. Changing from a higher level or lower level of quality therefore refers to selecting content having a different (either higher or lower) level of quality than a currently selected level of quality. For example, a higher level of quality might refer to content having a higher level of resolution, compared to other content having a lower level of resolution. Resolution, is merely an example, and is not intended to constrain the usage of the terms, quality, higher/lower level of quality.

The following briefly provides a simplified summary of the subject innovations in order to provide a basic understanding of some aspects. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, subject innovations are directed towards enabling a portion of a protected content stream to be played in a degraded quality or experience at a client device when a key and/or license for some other portion of the content stream is unobtainable, or is not obtained by the client device.

The key and/or license may be unavailable for any of a variety of reasons, including, but not limited to a failed network component, a failed key management device, or the like. In other situations, for example, where the client device might have insufficient battery power and/or central processing power, or other configuration deficiency, it may be determined that decryption and/or performing an access request for the key/license would be impracticable. In addition, for whatever reason, it may be beneficial to the content provider, or the like, that the user of the client device have some level of access to the content. This may be to enable a tiered, free-to-try, or freemium type of business model, for example. However, other business reasons may also be applicable.

Approaches disclosed herein employ a content stream that is composed of a plurality of layers, where a baseline layer is unencrypted, and has a lowest quality level of the plurality of layers. Possible embodiments of such layered content stream are described in more detail below in conjunction with FIG. 4. Some audio and video compression/decompression (CODEC) specifications include support for scalable or layered modes. For example, the MPEG-2 standard defines several profiles that include support for signal-to-noise ratio (SNR) and/or spatial scalable modes. Another example, is the H.264 standard with the Scalable Video Coding extension for temporal, spatial, and SNR scalability. Using a Scalable CODEC, different layers within the plurality of layers that compose the content stream may be used separately and/or combined with one or more lower layers by the scalable CODEC to progressively increase a quality of the content for play when keys/licenses are available, and/or a client configuration so allows.

In any event, when at least a portion of the content stream is received at the client device, at least a baseline layer that is unencrypted may be prepared and played. The baseline layer may be played at a degraded quality or experience level. In this manner, because no decryption is needed for at least the baseline layer to play, a time to 'first frame' for play may be minimized. A key/license request process may be performed while playing the content at the degraded quality. Should the key/license be unable to be obtained, the degraded quality content might still be able to continue to play. When and if the key/license becomes available, higher quality layers in the content stream may be decrypted and combined with the lower layers to increase a quality level of the played content. In one embodiment, the additional layers may be downloaded after obtaining the key/license while in another embodiment, they may be obtained before or in parallel to the key/license request. In yet another embodiment, the higher quality layers may be activated without additional stream downloads.

In one embodiment, one or more key rotations may be implemented, where a different key might be used to decrypt a later portion of the content stream than might have been used for decrypting of an earlier portion of the content stream. By allowing play of the content at a degraded level of quality or a current level of quality, the user may still enjoy the content, while the client device requests/and employs the different key(s)/licenses. In a similar manner, when the user fast forwards, or seeks a particular location within the content stream to start/re-start play, the disclosed innovations would allow fast time to start from the sought location, by playing the degraded quality layers, until any new keys/licenses are obtained and used to decrypt/access the higher encrypted layers of the plurality of layers in the content stream. The layers may then again be unlocked or otherwise combined to provide a higher quality level of play at the client device.

While the above discloses a content stream comprising a plurality of layers having at least one layer unencrypted at a lowest quality level, it should be understood that the plurality of layers may be received by the client device in different ways. For example, the plurality of layers may be received bundled together; lower layers might be sent at least in part at a higher priority rate than higher layers having higher quality levels and being encrypted; or in any of a variety of other combinations.

Moreover, while the discussions refer generating to protected content that may be streamed to the client device, the innovations are not constrained to streamed content. For example, in other embodiments, the content may have been downloaded onto the client device, and/or retrieved from a portable storage device such as an optical disk, flash drive, or the like, and for any of a variety of reasons, a decryption key/license or the like may be unavailable. This may be due to the client device being offline to a network, such that access to a remote network device having key/license is unavailable. Similarly, the remote network device may be failed, offline, or otherwise unavailable to the client device. In any case, it may still be desirable to allow the client device to play the content. However, play of the content, although not streamed, may be enabled in a degraded quality or experience mode, until the key/license is available.

Illustrative Operating Environment

Figure 1:
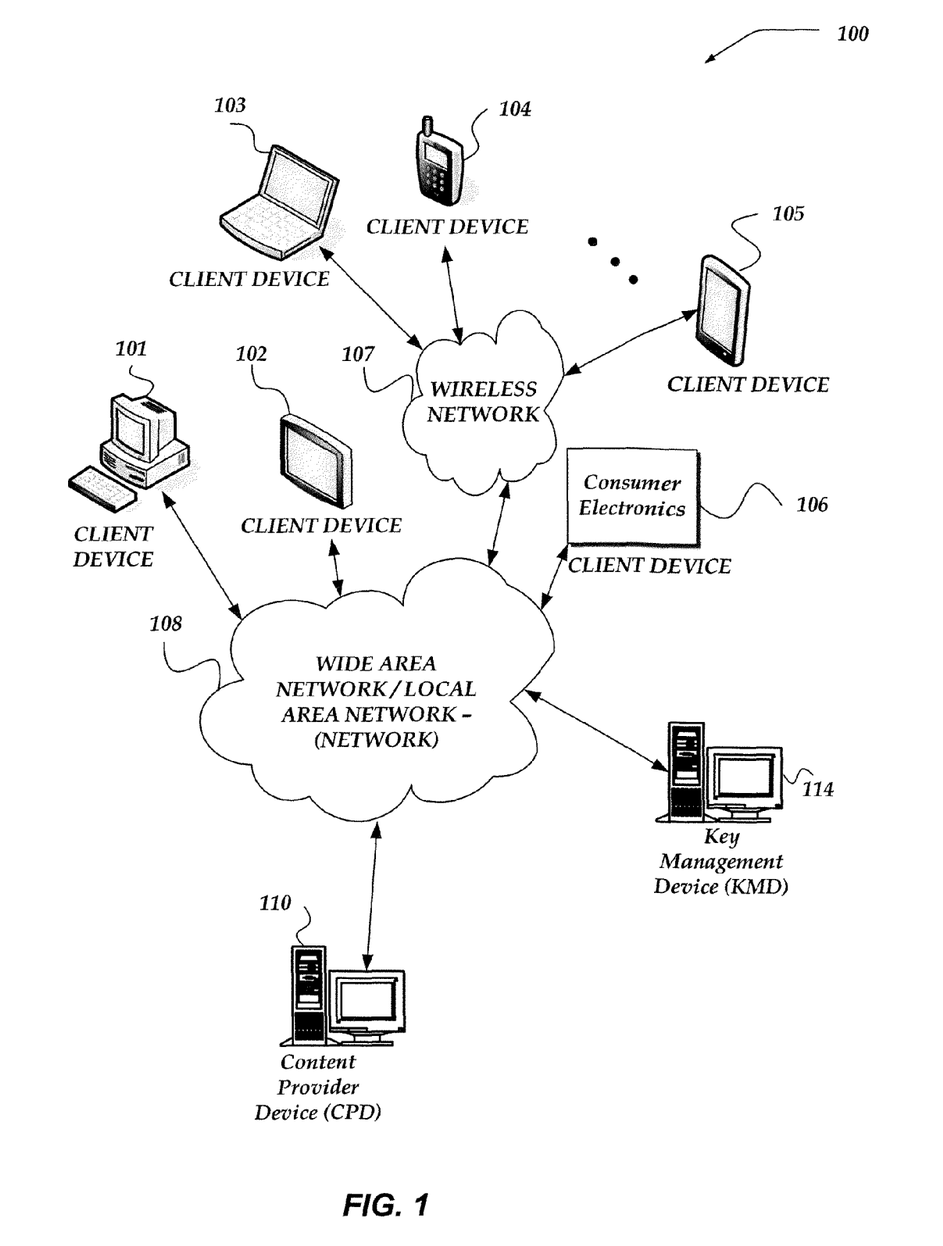
FIG. 1 illustrates a system diagram of one embodiment of an environment in which the embodiments may be practiced.

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")-(network) 108, wireless network 107, client devices 101-106, Content Provider Device ("CPD") 110, and Key Management Device (KMD) 114.

One embodiment of client devices 101-106 is described in more detail below in conjunction with FIG. 2. In one embodiment, at least some of client devices 101-106 may operate over a wired and/or a wireless network such networks 107 and 108. As shown, client device 101 may include virtually any computing device capable of communicating over a network to send and receive information, including instant messages, performing various online activities, or the like. The set of such devices may include devices that typically connect using a wired or wireless communications medium such as personal computers, multiprocessor systems, microprocessor-based or programmable consumer electronics, network PCs, or the like. Also, client device 102 may include virtually any device usable as a video display device, such as a television, display monitor, display screen, projected screen, and the like. Additionally, client device 106 may include any kind of Consumer Electronic device, e.g., a Blu-ray player, DVD player, CD player, portable music playing device, portable display projector, and the like. Moreover, client devices 101-106 may provide access to various computing applications, including a browser, or other web-based application.

Generally, however, client devices 101-106 may include virtually any portable computing device capable of receiving and sending messages over a network, accessing and/or playing content, such as network 108, wireless network 107, or the like. Further, client devices 103-105 may include virtually any portable computing device capable of connecting to another computing device and receiving information such as, laptop computer 103, smart phone 104, and tablet computers 105, and the like. However, portable computer devices are not so limited and may also include other portable devices such as cellular telephones, display pagers, radio frequency ("RF") devices, infrared ("IR") devices, Personal Digital Assistants ("PDAs"), handheld computers, wearable computers, integrated devices combining one or more of the preceding devices, and the like. As such, client devices 101-106 typically range widely in terms of capabilities and features.

A web-enabled client device may include a browser application that is configured to receive and to send web pages, web-based messages, and the like. The browser application may be configured to receive and display graphics, text, multimedia, media content, and the like, employing virtually any Internet-based and/or network-based protocol, including but not limited to a wireless application protocol messages ("WAP"), Hypertext Transfer Protocol ("HTTP"), or the like. In one embodiment, the browser application is enabled to employ Handheld Device Markup Language ("HDML"), Wireless Markup Language ("WML"), WMLScript, JavaScript, Standard Generalized Markup Language ("SGML"), HyperText Markup Audio Language ("HTML"), eXtensible Markup Language ("XML"), and the like, to display and send a message. In one embodiment, a user of a client device may employ the browser application to perform various activities over a network (online). However, another application may also be used to perform various online activities.

Client devices 101-106 also may include at least one other client application that is configured to receive and/or send content between another computing device. The client application may include a capability to send and/or receive content, or the like. The client application may further provide information that identifies itself, including a type, capability, name, and the like. In one embodiment, client devices 101-106 may identify themselves as part of a class of devices. In another embodiment, client devices 101-106 may uniquely identify themselves through any of a variety of mechanisms, including a phone number, Mobile Identification Number ("MIN"), an electronic serial number ("ESN"), Internet Protocol (IP) Address, network address, or other mobile device identifier. The information may also indicate a content format that the mobile device is enabled to employ. Such information may be provided in a network packet, or the like, sent between other client devices, CPD 110, or other computing devices. Moreover, it should be readily understood that devices and/or components within a device that is communicating with a client device may also identify themselves using any of a variety of mechanisms, including those used by the client device.

Client devices 101-106 may further be configured to include a client application that enables an end-user to log into an end-user account that may be managed by another computing device, such as CPD 110, or the like. Such end-user account, in one non-limiting example, may be configured to enable the end-user to manage one or more online activities, including in one non-limiting example, search activities, social networking activities, browse various websites, communicate with other users, or the like. In one embodiment, the end-user's client device may receive content streamed to the client device for play at the client device. However, participation in online activities may also be performed without logging into the end-user account.

Wireless network 107 is configured to couple client devices 103-105 and its components with network 108. Wireless network 107 may include any of a variety of wireless sub-networks that may further overlay stand-alone ad-hoc networks, and the like, to provide an infrastructure-oriented connection for client devices 101-106. Such sub-networks may include mesh networks, Wireless LAN ("WLAN") networks, cellular networks, and the like. In one embodiment, the system may include more than one wireless network.

Wireless network 107 may further include an autonomous system of terminals, gateways, routers, and the like connected by wireless radio links, and the like. These connectors may be configured to move freely and randomly and organize themselves arbitrarily, such that the topology of wireless network 107 may change rapidly.

Wireless network 107 may further employ a plurality of access technologies including 2nd (2G), 3rd (3G), 4th (4G) generation radio access for cellular systems, WLAN, Wireless Router ("WR") mesh, and the like. Access technologies such as 2G, 3G, 4G and future access networks may enable wide area coverage for mobile devices, such as client devices 101-106 with various degrees of mobility. In one non-limiting example, wireless network 107 may enable a radio connection through a radio network access such as Global System for Mobil communication ("GSM"), General Packet Radio Services ("GPRS"), Enhanced Data GSM Environment ("EDGE"), Wideband Code Division Multiple Access ("WCDMA"), and the like. In essence, wireless network 107 may include virtually any wireless communication mechanism by which information may travel between client devices 103-106 and another computing device, network, and the like.

Network 108 is configured to couple network devices with other computing devices, including, CPD 110, and through wireless network 107 to client devices 103-105. Network 108 is enabled to employ any form of network mechanism for communicating information from one electronic device to another. Also, network 108 can include the Internet in addition to LANs, WANs, direct connections, such as through a universal serial bus ("USB") port, other forms of network mechanism, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks ("ISDNs"), Digital Subscriber Lines ("DSLs"), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 108 may be configured to transport information of an Internet Protocol ("IP"). In essence, network 108 includes any communication method by which information may travel between computing devices.

Additionally, network mechanisms by way of example, network mechanisms include wired media such as twisted pair, coaxial cable, fiber optics, wave guides, and other wired media and wireless media such as acoustic, RF, infrared, and other wireless media.

One embodiment of CPD 110 is described in more detail below in conjunction with FIG. 3. Briefly, however, CPD 110 includes virtually any network device usable to operate as a content server to connect to network 108 to provide content to client devices 101-106. In some embodiments, CPD 110 may provide a content stream of digital content to a client device. In one embodiment, the content stream may comprise a plurality of layers. In one embodiment, at least some layers of the content stream may be encrypted, while at least some other layers may be unencrypted. In one embodiment, the unencrypted layer(s) may be encoded at a lower quality level, a lower resolution, or even a lower bit rate than other layers in the content stream. In another embodiment, CPD 110 may provide a plurality of layers using a scalable video coding approach. In one embodiment, CPD 110 may employ an Annex G extension of the H.264/MPEG-4 AVC video compression standard, or the like. In one embodiment, different layers within the plurality of layers may be encoded with differing levels of complexity and then later be combined to provide different levels of quality of playable content, such as is described in more detail below in conjunction with FIG. 4. Similarly, encryption may be performed using varying levels of complexity.

It should be readily recognized that CPD 110 is configured to operate on behalf of a content owner, distributor, or similar business entity. However, while used herein to represent such network devices usable to provide content, it is further recognized that other devices may also be employed. For example, a content provider may employ a Content Distribution Network Device (not shown) that operates on behalf of the content provider to provide content. Thus, other configurations and variations of devices serving content are also envisaged, and other embodiments are not constrained to a single configuration/arrangement of devices.

Devices that may operate as CPD 110 include various network devices, including, but not limited to personal computers, desktop computers, multiprocessor systems, microprocessor-based or programmable consumer electronics, network PCs, server devices, network appliances, and the like.

Although FIG. 1 illustrates CPD 110 as a single computing device, the invention is not so limited. For example, one or more functions of CPD 110 may be distributed across one or more distinct network devices. Moreover, CPD 110 is not limited to a particular configuration. Thus, in one embodiment, CPD 110 may contain a plurality of network devices to provide content, licenses, and/or decryption keys to a client device, such as client devices 101-106. Similarly, in another embodiment, CPD 110 may contain a plurality of network devices that operate using a master/slave approach, where one of the plurality of network devices of CPD 110 operates to manage and/or otherwise coordinate operations of the other network devices. In other embodiments, the CPD 110 may operate as a plurality of network devices within a cluster architecture, a peer-to-peer architecture, and/or even within a cloud architecture. Thus, the invention is not to be construed as being limited to a single environment, and other configurations, and architectures are also envisaged.

In one embodiment, CPD 110 may also be configured to manage license requests, and/or access to decryption keys usable to decrypt portions of the encrypted digital content by a client device for play based on the license.

It should be noted that the encrypted content may be encrypted using any of a variety of symmetric and/or asymmetric key technologies. For example, possible asymmetric keys technologies include, but are not limited to, Diffie-Hellman, RSA, Merkle-Hellman, PGP, X.509, elliptic curve techniques, EIGamal, or the like. Similarly, various possible symmetric key technologies include, but are not limited to, Twofish, Serpent, AES (Rijndael), Blowfish, CAST5, RC4, 3DES, and IDEA, to name just a few. Moreover, the content may be protected using a combination of symmetric and asymmetric key technologies. For example, a symmetric content decryption key might be used to encrypt/decrypt the content, and an asymmetric key technology might be used to encrypt/decrypt the content decryption key.

KMD 114 represents one of a variety of network devices for managing access to symmetric and/or asymmetric keys. In one embodiment, KMD 114 may operate to certify an ownership of a public key named within a digital certificate that provides a public key, where the public key is part of a public/private key associated with any of a variety of asymmetric key technologies. This allows others, such as CPD 110, or the like, to rely upon signatures or assertions made by the owner that corresponds to the public key that is certified. In one embodiment, KMD 114 may then operate as a trusted third party. Thus, in one embodiment, KMD 114 may operate as a Certification Authority, such as employed by many public key infrastructures (PKI) schemes. Further, KMD 114 may also provide Certificate Revocation Lists (CRLs) indicating when a public key/certificate is no longer valid, and might no longer be trusted/trustable.

In one embodiment, KMD 114 may receive a public key from a content provider, or the like, and based on various criteria, elect to make accessible the public key through a certificate that KMD 114 digitally signs. In one embodiment, access to the public key may enable an authorized client device to decrypt a content key that may then be used to decrypt at least a portion of the encrypted content.

In one embodiment, KMD 114 or CPD 110 might operate to negotiate a license and/or access to a key with client devices 101-106. In one embodiment, different content decryption keys might be used to encrypt different portions of a provided content. Thus, in one embodiment, multiple key negotiations may be performed for a given at least one content stream.

It should be understood, that while KMD 114 is illustrated as a separate device from CPD 110, in other embodiments, the functions of these devices may be integrated.

Although FIG. 1 illustrates KMD 114 as single computing devices, the invention is not so limited. For example, one or more functions of KMD 114 may be distributed across one or more distinct network devices. Moreover, KMD 114 is not limited to a particular configuration. Thus, in one embodiment, KMD 114 may contain a plurality of network devices. Similarly, in another embodiment, KMD 114 may contain a plurality of network devices that operate using a master/slave approach, where one of the plurality of network devices operates to manage and/or otherwise coordinate operations of the other network devices. In other embodiments, the KMD 114 may operate as a plurality of network devices within a cluster architecture, a peer-to-peer architecture, and/or even within a cloud architecture. Thus, the invention is not to be construed as being limited to a single environment, and other configurations, and architectures are also envisaged.

Illustrative Client Device

Figure 2:
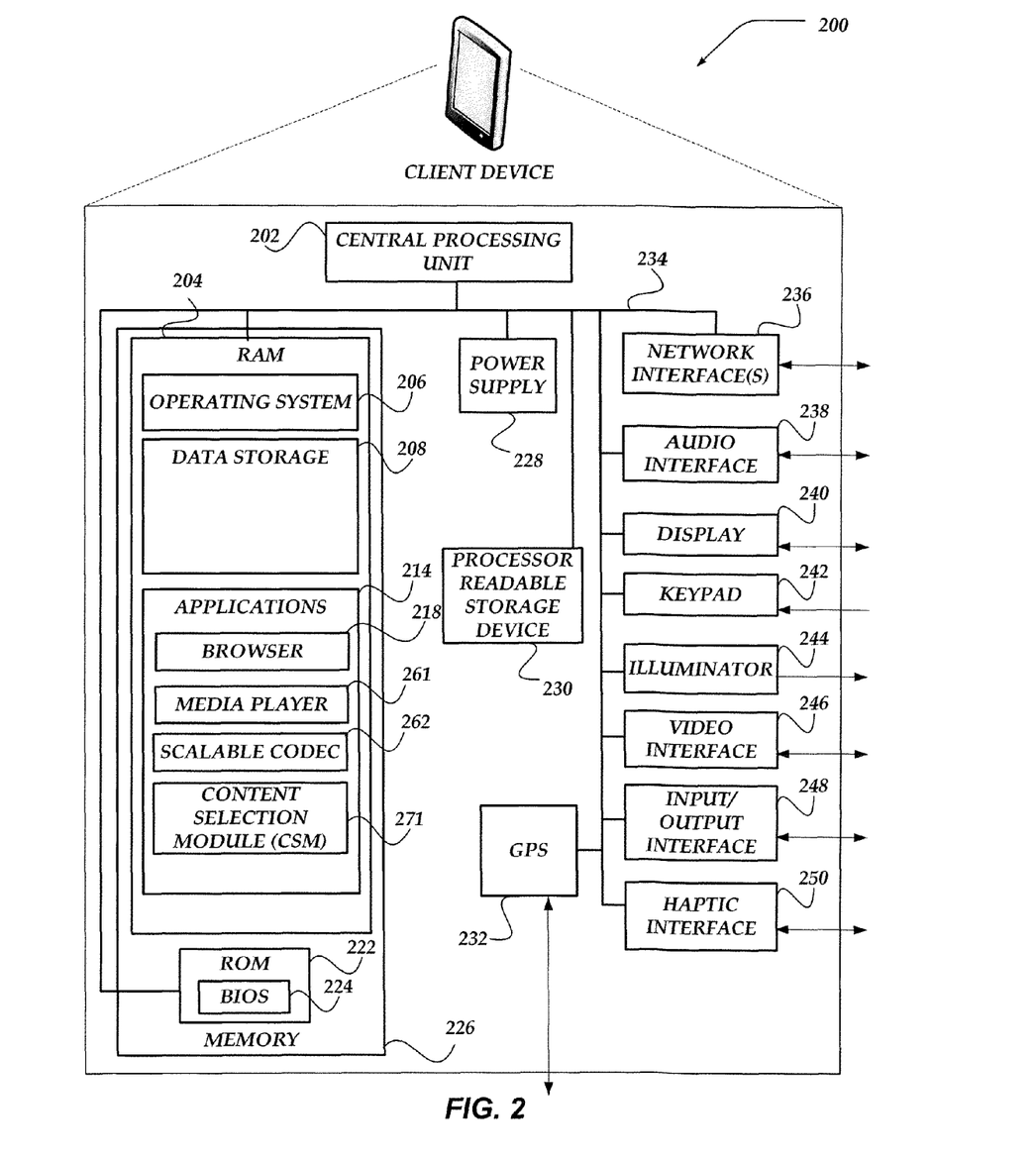
FIG. 2 illustrates one possible embodiment of a client device usable within the environment of FIG. 1.

FIG. 2 shows one embodiment of client device 200 that may be included in a system implementing the invention. Client device 200 may represent any of a variety of platforms usable to perform actions as disclosed within. Client device 200 may include many more or less components than those shown in FIG. 2. However, the components shown are sufficient to disclose an illustrative embodiment for practicing the present invention. Client device 200 may represent, for example, one embodiment of at least one of client devices 101-106 of FIG. 1.

As shown in the figure, client device 200 includes a central processing unit ("CPU") 202 in communication with a mass memory 226 via a bus 234. Client device 200 also includes a power supply 228, one or more network interfaces 236, an audio interface 238, a display 240, a keypad 242, an illuminator 244, a video interface 246, an input/output interface 248, a haptic interface 250, and a global positioning systems ("GPS") receiver 232.

Power supply 228 provides power to client device 200. A rechargeable or non-rechargeable battery may be used to provide power. The power may also be provided by an external power source, such as an alternating current ("AC") adapter or a powered docking cradle that supplements and/or recharges a battery.

Client device 200 may optionally communicate with a base station (not shown), or directly with another computing device. Network interface 236 includes circuitry for coupling client device 200 to one or more networks, and is constructed for use with one or more communication protocols and technologies including, but not limited to, GSM, code division multiple access ("CDMA"), time division multiple access ("TDMA"), user datagram protocol ("UDP"), transmission control protocol/Internet protocol ("TCP/IP"), Short Message Service ("SMS"), GPRS, WAP, ultra wide band ("UWB"), Institute of Electrical and Electronics Engineers ("IEEE") 802.16 Worldwide Interoperability for Microwave Access ("WiMax"), session initiated protocol/real-time transport protocol ("SIP/RTP"), or any of a variety of other wired and/or wireless communication protocols. Network interface 236 is sometimes known as a transceiver, transceiving device, or network interface card ("NIC").

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be an LCD, gas plasma, light emitting diode ("LED"), or any other type of display used with a computing device. Display 240 may also include a touch sensitive screen arranged to receive input from an object such as a stylus or a digit from a human hand.

Moreover, display 240 may be configured to employ any of a variety of network connection types, including, but not limited to High-Bandwidth Digital Content Protection (HDCP) connection types, Display Port (DP), Digital Visual Interface (DVI), and High-Definition Multimedia Interface (HDMI), as well as Gigabit Video Interface (GVIF), Standard-definition (SD), Unified Display Interface (UDI), WiDi. At least some of these network connection types provide a form of digital copy protection. A detection of whether display 240 is connected through one of these, or other types, of network connection types may be determined using a variety of techniques, including signature transmissions, protocol handshakes, authentication procedures, or the like. Changing usage of a network connection type may indicate a change in a level of trust of at least one component of client device 200, and therefore might indicate a configuration change to the client device 200.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the client device is powered. Also, illuminator 244 may backlight these buttons in various patterns when particular actions are performed, such as dialing another client device. Illuminator 244 may also cause light sources positioned within a transparent or translucent case of the client device to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor ("CMOS") integrated circuit, charge-coupled device ("CCD"), or any other integrated circuit for sensing light.

Client device 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like. Haptic interface 250 is arranged to provide tactile feedback to a user of the client device. For example, the haptic interface 250 may be employed to vibrate client device 200 in a particular way when another user of a computing device is calling.

GPS transceiver 232 can determine the physical coordinates of client device 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, triangulation, assisted GPS ("AGPS"), Enhanced Observed Time Difference ("E-OTD"), Cell Identifier ("CI"), Service Area Identifier ("SAI"), Enhanced Timing Advance ("ETA"), Base Station Subsystem ("BSS"), or the like, to further determine the physical location of client device 200 on the surface of the Earth. It is understood that under different conditions, GPS transceiver 232 can determine a physical location within millimeters for client device 200; and in other cases, the determined physical location may be less precise, such as within a meter or significantly greater distances. In one embodiment, however, mobile device 200 may through other components, provide other information that may be employed to determine a physical location of the device, including for example, a Media Access Control ("MAC") address, IP address, or the like.

Mass memory 226 includes a Random Access Memory ("RAM") 204, a Read-only Memory ("ROM") 222, and other storage means. Mass memory 226 illustrates an example of computer readable storage media (devices) for storage of information such as computer readable instructions, data structures, program modules or other data. Mass memory 226 stores a basic input/output system ("BIOS") 224 for controlling low-level operation of client device 200. The mass memory also stores an operating system 206 for controlling the operation of client device 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Mass memory 226 further includes one or more data storage 208, which can be utilized by client device 200 to store, among other things, applications 214 and/or other data. For example, data storage 208 may also be employed to store information that describes various capabilities of client device 200. The information may then be provided to another device based on any of a variety of events, including being sent as part of a header during a communication, sent upon request, or the like. Data storage 208 may also be employed to store social networking information including address books, buddy lists, aliases, user profile information, or the like. Further, data storage 208 may also store messages, web page content, or any of a variety of user generated content. At least a portion of the information may also be stored on another component of network device 200, including, but not limited to computer readable storage device 230, a disk drive or other computer-readable storage device (not shown) within client device 200.

In some embodiments, data storage 208 may act as a buffer for content received from CPD 110 of FIG. 1. As noted above, it is recognized that providing of such content may also be performed by another device on behalf of CPD 110 of FIG. 1.

Applications 214 may include computer executable instructions which, when executed by client device 200, transmit, receive, and/or otherwise process messages (e.g., SMS, Multimedia Message Service ("MMS"), instant messages ("IM"), email, and/or other messages), audio, video, and enable telecommunication with another user of another client device. Other examples of application programs include calendars, search programs, email clients, IM applications, SMS applications, voice over Internet Protocol ("VoIP") applications, contact managers, task managers, transcoders, database programs, word processing programs, security applications, spreadsheet programs, games, search programs, and so forth. Applications 214 may include, for example, browser 218, media player 261, Content Selection Module 271, and Scalable Coder/Decoder (CODEC) 262 (also sometimes referred to as Compressor/Decompressor).

Browser 218 may include virtually any application configured to receive and display graphics, text, multimedia, and the like, employing virtually any web based protocol. In one embodiment, the browser application is enabled to employ HDML, WML, WMLScript, JavaScript, SGML, HTML, XML, and the like, to display and send a message. However, any of a variety of other web-based programming languages may be employed. In one embodiment, browser 218 may enable a user of client device 200 to provide and/or receive content from another computing device, such as CPD 110 of FIG. 1. Although browser 218 is described herein, it should be noted that there are a plurality of other applications that may operate as a user agent configured to request and/or access content. Thus, other user agents may also be included within client device 200.

Media player 261 represents any of a variety of software and/or hardware configurations arranged to receive and play various content. As such, in one embodiment, media player 261 may also represent a hardware component that might be installed within client device 200 and/or coupled electrically to client device 200 to enable client device 200 to access and play content.

CSM 271 represents any of a variety of software and/or hardware configurations arranged to receive a stream of digital content, where the received at least one stream of content has a plurality of different layers, having one or more different levels of defined quality of content. CSM 271 may receive information about a detected configuration of client device 200 from one or more components of client device 200. For example, the operating system, and/or application programming interfaces (APIs), hardware components, or the like, may provide a configuration to CSM 271. Then, using the configuration information CSM 271 selects a level of defined quality of the content for play. In one embodiment, CSM 271 may further negotiate one or more licenses, and/or decryption keys usable to decrypt and enable play of the stream of content at the determined level of quality. In one embodiment, some of the received at least one stream of content may be unencrypted. In any event, CSM 271 may include one or more rules, criteria, or the like, indicating that at least a lowest level of quality of the content stream might be prepared and enabled for play, even when a decryption key(s)/license(s) are currently unobtainable. In this manner, a user may still be allowed to access and play at least a portion of the content stream. When/if a key/license is made available, the one or more encrypted layers may then be decrypted and sent to scalable CODEC 262 to be combined and sent to media player 261 for play.

In one embodiment, while CSM 271 is described as enforcing licenses, another component, entity, application, hardware component, of the like, may perform such actions instead. Thus, the configuration of FIG. 2 is not to be construed as limiting embodiments of the innovation. In any event, CSM 271 may provide some of the content to media player 261 for play. In one embodiment, media player 261 might receive some of the content in a coded or compressed form. Media player 261 may then employ scalable CODEC 262 to decode and/or decompress the received portion of content stream such that the content is readied for play virtually as soon as it is received. CSM 271 may employ a process such as disclosed below in conjunction with FIG. 5 to perform at least some of its actions.

Scalable CODEC 262 includes any of a variety of compression/decompression mechanisms configured to receive compressed content and decompress the content into a format capable of being rendered for the user's enjoyment. For example, scalable CODEC 262 may employ Moving Pictures Experts Group (MPEG), Joint Photographic Experts Group (JPEG), wavelets, and/or any other mechanism that compresses content that may later be decompressed. Further, although scalable CODEC 262 may include capabilities for graphical content, scalable CODEC 262 may also be configured to receive audio content, and as appropriate, prepare the audio content for play by a media player as well. Thus, scalable CODEC 262 may not be exclusive for graphical content, and may also operate on audio, graphical content, and/or content having a combination of audio and graphical information.

In one embodiment, scalable CODEC 262 may also be configured to receive scalable video coding content that is encoded in a plurality of layers. In one embodiment, the layers of video bitstreams may be derived by dropping packets from a larger video to reduce a bandwidth for one of the layered bitstreams. The layers, described further below in conjunction with FIG. 4 may represent a lower spatial resolution (smaller screen), lower temporal resolution (lower frame rate), lower quality/less data (e.g., at a same resolution), or the like. Scalable CODEC 262 may receive various layers, including a baseline profile layer, and one or more higher quality profile layers. Scalable CODEC 262 may then combine the layers to produce for play a single stream of content that has a level of quality at the highest layer employed in the combination.

Illustrative Network Device

Figure 3:
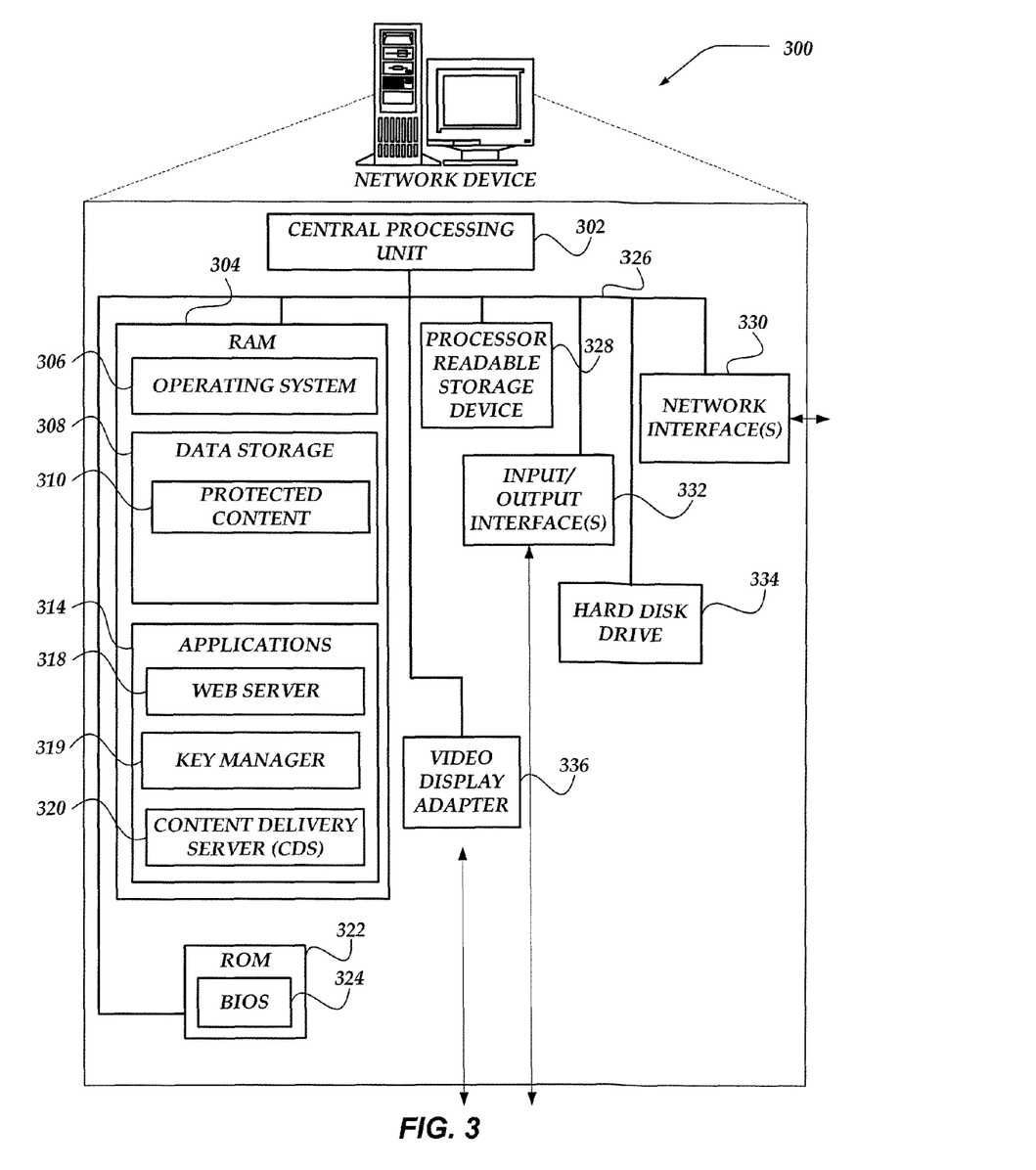
FIG. 3 illustrates one possible embodiment of a network device usable by a content provider within the environment of FIG. 1.

FIG. 3 shows one embodiment of a network device 300, according to one embodiment of the invention. Network device 300 may include many more or less components than those shown. The components shown, however, are sufficient to disclose an illustrative embodiment for practicing the innovation. Network device 300 may be configured to operate as a server, a client, a peer, a host, or any other device. Network device 300 may represent, for example CPD 110 of FIG. 1.

Network device 300 includes central processing unit 302, computer readable storage device 328, network interface unit 330, an input/output interface 332, hard disk drive 334, video display adapter 336, and a mass memory, all in communication with each other via bus 326. The mass memory generally includes RAM 304, ROM 322 and one or more permanent (non-transitory) mass storage devices, such as hard disk drive 334, tape drive, optical drive, and/or floppy disk drive. The mass memory stores operating system 306 for controlling the operation of network device 300. Any general-purpose operating system may be employed. BIOS 324 is also provided for controlling the low-level operation of network device 300. As illustrated in FIG. 3, network device 300 also can communicate with the Internet, or some other communications network, via network interface unit 330, which is constructed for use with various communication protocols including the TCP/IP protocol. Network interface unit 330 is sometimes known as a transceiver, transceiving device, or network interface card (NIC).

Network device 300 also comprises input/output interface 332 for communicating with external devices, such as a keyboard, or other input or output devices not shown in FIG. 3. Input/output interface 332 can utilize one or more communication technologies, such as USB, infrared, Bluetooth™, or the like.

The mass memory as described above illustrates another type of computer-readable media, namely computer-readable storage media and/or processor-readable storage media. Computer-readable storage media (devices) may include volatile, nonvolatile, removable, and non-removable media implemented in any method or technology for storage of information, such as computer readable instructions, data structures, program modules, or other data. Examples of computer readable storage media include RAM, ROM, Electrically Erasable Programmable Read-only Memory ("EEPROM"), flash memory or other memory technology, Compact Disc Read-only Memory ("CD-ROM"), digital versatile disks ("DVD") or other optical storage, magnetic cassettes, magnetic tape, magnetic disk storage or other magnetic storage devices, or any other physical media which can be used to store the desired information and which can be accessed by a computing device.

As shown, data storage 308 may include a database, text, spreadsheet, folder, file, or the like, that may be configured to maintain and store user account identifiers, user profiles, email addresses, IM addresses, and/or other network addresses, or the like. Data storage 308 may further include program code, data, algorithms, and the like, for use by a processor, such as central processing unit 302 to execute and perform actions. In one embodiment, at least some of data storage 308 might also be stored on another component of network device 300, including, but not limited to computer readable storage device 328, hard disk drive 334, or the like.

Data storage 308 may further store streams of protected content 310. Streams of protected content 310 represent any of a variety of content that may be protected from access using a license, encryption, and/or the like. In some embodiments, streams of protected content 310 may include a plurality of available versions of content. In one embodiment, the available versions may include one or more video tracks and/or one or more one or more audio tracks. In some embodiments, each video track may be in a different video quality, or the like. In other embodiments, each audio track may be in a different audio quality or the like. Various non-limiting, non-exhaustive examples of streams of protected content 310 are described in more detail below in conjunction with FIG. 4.

The mass memory also stores program code and data. One or more applications 314 are loaded into mass memory and run on operating system 306. Examples of application programs may include transcoders, schedulers, calendars, database programs, word processing programs, Hypertext Transfer Protocol ("HTTP") programs, customizable user interface programs, IPSec applications, encryption programs, security programs, SMS message servers, IM message servers, email servers, account managers, and so forth. Web server 318, key manager 319, and content delivery server 320, may also be included as application programs within applications 314.

Web server 318 represent any of a variety of services that are configured to provide content, including messages, over a network to another computing device. Thus, web server 318 includes, for example, a web server, an FTP server, a database server, a content server, or the like. Web server 318 may provide the content including messages over the network using any of a variety of formats including, but not limited to WAP, HDML, WML, SGML, HTML, XML, Compact HTML ("cHTML"), Extensible HTML ("xHTML"), or the like. Web Server 318 may also be configured to enable a user of a client device, such as client devices 101-106 of FIG. 1, to browse content, such as streams of protected content 310, and select content for display/play on the client device.

Key manager 319 is configured to manage negotiations of decryption keys and/or licenses for content streams. In one embodiment, key manager 319 may provide decryption keys and/or licenses to KMD 114 of FIG. 1. In other embodiments, key manager 319 may perform negotiations directly with a client device. In one embodiment, key manager 319 may select one or more content decryption keys for use in encrypting different portions of a content stream.

Key manager 319 may also be configured to revoke a license, and/or invalidate one or more decryption keys, based, for example, on an unauthorized request for a license, key, or even based on receiving an indication that an integrity of a requesting client device is determined to be compromised.

Content Delivery Server (CDS) 320 is configured to manage access to streams of protected content 310. In one embodiment, the content may be protected through a license or licenses. In another embodiment, the content may be protected by being encrypted. In one embodiment, one portion of content may be encrypted using a first content encryption key; while another portion of the content may be encrypted using a second content encryption key. Thus, to decrypt the protected content, a user's client device may need access to a license that indicates how, where, and/or when the protected content may be accessed. The user's client device may also need access to one or more decryption keys usable to decrypt various portions of the protected content. In one embodiment, where multiple encryption keys are used to encrypt the content, a key rotation scheme may be employed, where the client device is provided an indication that the content is encrypted using a different key, and that the client device will have to use the different key. However, in another embodiment, the content may be protected by a license(s) and not be encrypted using encryption key(s).

Moreover, in at least one embodiment, network device 300 may be configured to provide to a client device, such as shown in FIGS. 1-2, a content selection module (CSM) 271 and/or a scalable CODEC 262. For example, during an initial registration with a content provider device, such as CPD 110 of FIG. 1, or the like, network device 300 may provide for download, or any other form of access, CSM 271, and/or other components. The receiving client device may then install for execution such components for use with various embodiments described herein.

General Operation

Figure 4:
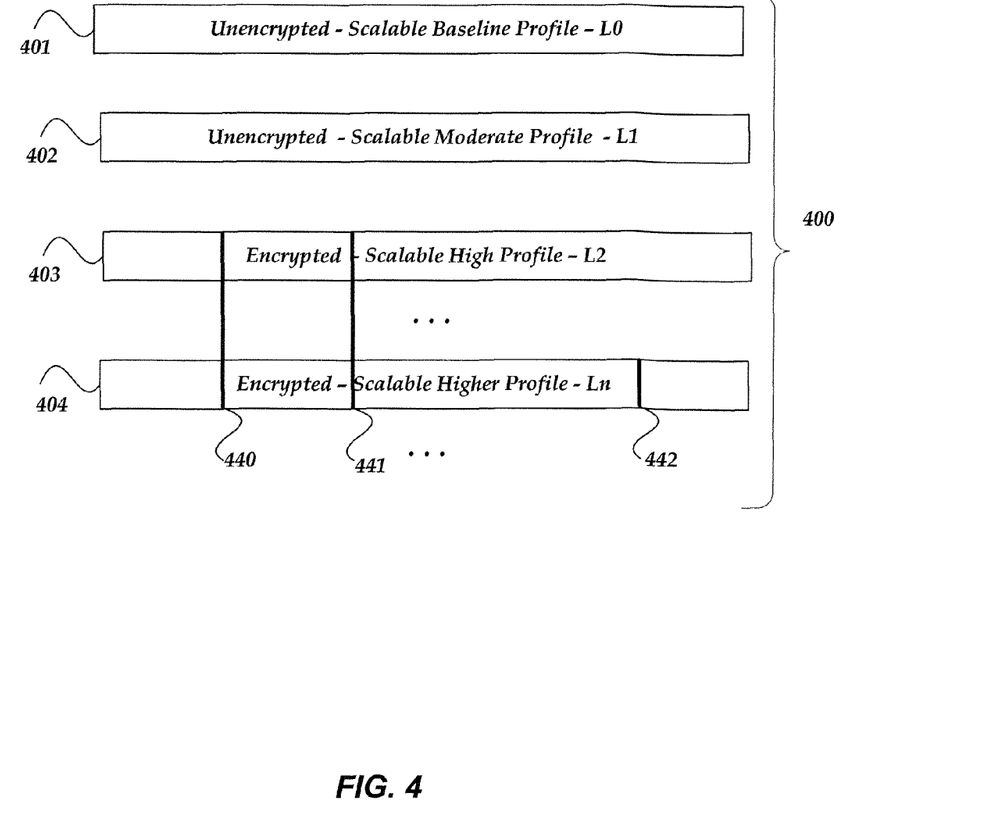
FIG. 4 illustrates non-limiting, non-exhaustive examples of a possible embodiment of a stream of content having layers.

The operation of certain aspects of various embodiments will now be described with respect to FIG. 4-5. FIG. 4 illustrates non-limiting, non-exhaustive examples of a possible embodiment of a stream of content having layers. It should be understood that the provided stream of content 400 is merely an example, and that the innovations described herein are not constrained by this example. The example content 400 shown, however, is sufficient to disclose an illustrative embodiment for practicing the innovation.

As discussed above, the content stream may include one or more layers 401-404, having one or more different types of scalability, including, but not limited to temporal, spatial, SNR, and even dimensionality, color differences, or the like.

Generally, temporal scalability may refer to content that is coded at multiple frame rates (video) or sampling rates (audio). For example, a base layer may provide video encoded at 7.5 frames per second (FPS) video, while enhancement or higher layers can be added to improve the frame rate to 15 FPS and 30 FPS. For example, a bitstream baseline layer might be encrypted with B-frames or VP6/VP8 frames such that one might be able to view unencrypted lower layers at one frame per second, but with a proper license/key, might be able to obtain a full 30 FPS. Spatial scalability may include video that is coded at multiple spatial resolutions. For example, a base layer may provide video encoded at a resolution of 320 by 240, while multiple enhancement or higher layers may increase the resolution to 640 by 480 and 800 by 600. SNR scalability may refer to content that is coded at multiple degrees of fidelity or clarity. For example, a base layer may provide audio encoded at 8 bits per sample, while enhancement layers increase the bit depth to 16 and 24 bits per sample. Similarly, dimensionality may refer to layers that are encoded to provide different dimensions of viewing. For example, a base layer may provide 2-dimensional images, while combined with higher or multiple enhancement or higher layers, three-dimensional viewing may be obtained. Color differences refer generally to providing enhanced coloring to video. For example, one or more baseline or lower layers might provide for gray or black/white video images, while higher layers might enable more coloring, brightness, contrast, or the like to the video image.

Other types of variations may also exist. For example, video frames might be encrypted without iFrames for lower layers, such as a baseline layer, and for higher layers intra frames may be selectively added. In another example, intra macro blocks might be encrypted in the higher layers. In another example, lower layers might be unencrypted and provide standard-definition (SD) quality, while higher encrypted layers provide high-definition (HD) quality, or better. Similarly, lower layers might have colors skewed slightly to enable degraded viewing; a blur filter might have been applied to the lower layers, and not to the encrypted higher level quality layers. Similarly, audio might be corrupted to a degraded but tolerable level in the baseline layers, and higher quality audio provided with higher encrypted layers. It should be clear that the above are merely examples of various mechanisms useable for varying a quality level of the layers of the content stream, and the innovation is not limited to these examples.

Moreover, it should be recognized that one or more combinations of the above, or other mechanisms, may be used to vary a level of quality of the layers of the content stream.

In any event, as shown in FIG. 4, content stream 400 may comprise a plurality of layers 401-404. As shown, one or more layers 401 and 402 may be unencrypted, while other layers, shown here as layers 403-404 may be encrypted using one or more encryption keys. Layer 401 may be herein termed a baseline layer, having a lowest quality level of layers 401-404 in content stream 400. Often, baseline layer 401 may be configured to be a valid bitstream that may be playable by itself. Thus, as discussed herein layer 401 may be received and being unencrypted, prepared for play within a minimum time to a first frame. However, playing of the baseline layer 401 would occur at a degraded quality level using one or more mechanisms such as described above. Based on various configurations of the client device, it might be determined that a slightly improved level of quality might be allowed for play. Thus, in one embodiment, multiple unencrypted layers might be obtained and combined for play, such as layers 401-402. When and if a key/license is obtained, higher layers in the plurality of layers may be decrypted and combined and/or prepared for play to provide higher levels of quality. Should a key/license not be obtained for any reason, the client device might still be permitted to play the lower quality lower layers 401 and/or 402.

It is noted however that while the above discloses encrypting a stream having a plurality of layers, in another embodiment, the higher quality layers may be provided using other mechanisms instead of being directly encrypted. For example, in one embodiment, the higher quality layers, such as layers 403-404, might be provided unencrypted, but restricted from being accessed improperly, using, Hypertext Transfer Protocol Secure (HTTPS) to wrap or encrypt the network transfer of the layers. Similarly, other mechanisms might also be used, to protect the transfer of the layers to the client device, such as using time-limited uniform resource locator (URL), where a content provider might elect to respect a URL for a limited amount of time. It should also be noted that while layers 403-404 appear to indicate that the restricted-access information might be a full layer, other embodiments, might be otherwise. For example, in some embodiments, a seed might be used to increase a quality of the content.

As shown, layers 403 and 404 indicate various points that represent key rotation points 440-442. Such points may coincide, in one embodiment, with defined seek locations. However, in other embodiment, such key rotation points 440-442 might be based on other criteria. In any event, content in a layer prior to a key rotation point is encrypted using a different key/license that content in the layer after the key rotation point. Thus, to continue play of the layer of content after a key rotation point, the client device will need to access the proper new key/license. In one embodiment, various layers may have key rotation points that coincide, such as key rotation points 440 and 441. However, in another embodiment, a key rotation point, such as key rotation point 442 might apply to one layer 404 and not another layer 403. Thus, in this example, layer 403 might continue to be decrypted and played using a key already obtained, although layer 404 might cease to play. In this manner, the client device might degrade play quality of the content using layers 401-403, until the key for layer 404 associated with key rotation point 442 is obtained, if at all.

Figure 5:
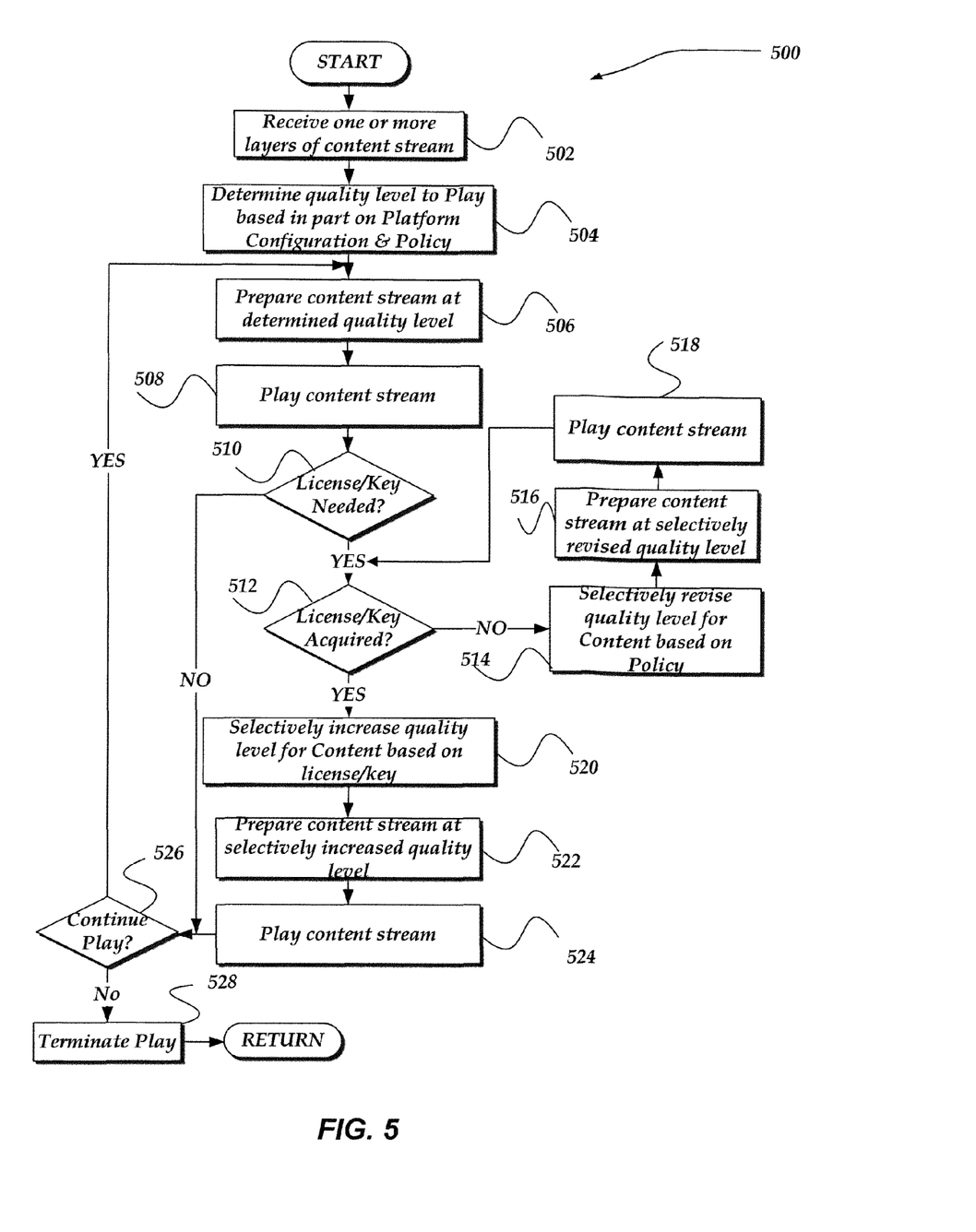
FIG. 5 illustrates a flow chart of one embodiment of a process usable to enable play of at least some of a content stream in a degraded quality or experience when a key or license for another portion of the content stream is not obtainable.

FIG. 5 illustrates a flow chart of one embodiment of a process usable to enable play of at least some of a content stream in a degraded quality or experience when a key or license for another portion of the content stream is not obtainable. Process 500 of FIG. 5 may be implemented in computer-executable instructions that may be executed by one or more processors within a client device, such as shown in FIGS. 1-2. Moreover, the computer-executable instructions may be stored on a memory device, or other apparatus having a non-transitory computer-readable medium, and in response to execution by a computing device, cause the computing device to perform operations described in part by process 500.

Process 500 may be understood to begin, after a start block, at block 502. In one embodiment, a user of a client device may have selected a content stream for play at the client device, using any of a variety of mechanisms, including but not limited to an application, a web page interface, a media player interface, or the like. In any event, in one embodiment, the client device may receive one or more layers of the content stream, as described above, where at least one layer of the content stream is unencrypted and is configured at a lower level of quality of content than another layer of the layers of the content stream.

Proceeding to block 504, a quality level to play the received content stream is determined. In one embodiment, the determination may be based on a policy and a configuration of the client device. For example, in one embodiment, the configuration might be based on whether the client device is using its own power supply, rather than being plugged into an external power source; or has what might be determined to be a slow processor or low level of decryption capability; a small/low resolution screen; minimal security level components activated; or the like. Thus, in one embodiment, a configuration of the client device might be used to initially determine a level of quality usable to play the content. However, in another embodiment, the policy might be that a highest level of unencrypted content's quality level is selected, independent of a client configuration. Thus, a variety of criteria might be used to determine a level of quality for play.

Moving to block 506 the unencrypted layers of the content stream may be combined, or otherwise used singularly to prepare content at a determined quality level. For example, in one embodiment, it might be determined that a highest level of quality obtainable without performing decryption might be used based on the received layer(s) of the content stream. In FIG. 4, for example, that might include combining layers 401-402. However, in another embodiment, the lowest or baseline layer of unencrypted content might be prepared for play. In one embodiment, preparing the content layer(s) may include, but is not limited to, decompressing/decoding the layer(s), and as appropriate combining the layers. Preparation might be performed, in one embodiment, using a scalable CODEC. Process then proceeds to block 508, where the prepared content may be played by the client device. In one embodiment, as discussed above, the initial playing of the content might be considered at a degraded level of quality using unencrypted content to enable a minimum amount of time to receive and play the first frame of the content, including a first frame after a seek is performed.

Processing continues to decision block 510, where a determination is made whether a key/license is needed for higher layers of the content (where a higher quality layer is available), or based on a result of a key/license rotation, and/or a key rotation event. If not, then processing flows to decision block 526; otherwise, processing flows to decision block 512.

At decision block 512, a determination is made whether the required key/license for the higher layer(s) of content is acquired. In one embodiment, if a key/license is required, a request may be made to acquire the key/license. However, for any of a variety of reasons, the required key/license might not be obtained, or is otherwise unobtainable. For example, the client device may be offline, a KMD, such as KMD 114 of FIG. 1 might be offline or otherwise unavailable. However, other reasons may result in the client device being unable to obtain the required key/license. In any event, if the license/key is not acquired processing flows to block 514; otherwise, processing flows to block 520.

At block 514, in one embodiment, the currently playing level of quality might be selectively revised. For example, looking at content stream 400 of FIG. 4, playing of the content stream might be at a first key rotation point such as key rotation point 440. At this point, a new key might be needed to continue to play at the level of quality obtainable by layers 401-404. Thus, the quality level might be degraded to what is obtainable using layers 401-402. In another example, the content might be at key rotation point 442, allowing a degraded play using layers up to layer 403, and degrading from play of up to layer 404. Similarly, where no key is obtained yet, play might currently be using up to layer 402, and no change in the quality level might arise, and layers up to layer 402 might continue to be played.

In any event, the content stream may be prepared for play based on selectively revising the quality level of the content, at block 516 of FIG. 5. Moving to block 518, the prepared content stream using the selectively revised quality level is played. Processing loops back to decision block 512. However, in one embodiment, where a key is unneeded for another layer of content, processing may instead flow to decision block 510.

At block 520, it is determined that the license/key is acquired, and the quality level may be selectively increased from what is currently playing. In one embodiment, the key/license might allow the client device to continue to decrypt, prepare, and play the layers of the content stream at a current quality level. However, in another embodiment, acquisition of the key/license may enable an increased level of quality of the content stream to be obtained by decrypting and combining various layers in the content stream. In any event, processing flows to block 522, where the layers are decrypted, combined, and prepared for play at the selectively increased quality level. Moving to block 524, the prepared content is played. In one embodiment, when transitioning between different quality levels, the transition may be coordinated with a currently playing frame, to minimize perceivable transitions. Processing then flows to decision block 526.

At decision block 526, a determination is made whether to continue to play the content. If so, then processing loops back to block 506; otherwise, processing flows to block 528 where the play of the content is terminated. Processing then returns to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system, a cloud system, a multi-server system, or the like. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A client device, comprising:
a network interface to receive content over a network; and
one or more hardware processors configured to:
receive a plurality of layers for a content stream, at least a first layer of the plurality of layers being unencrypted and enabling a lowest level of play quality for the plurality of layers, and at least a second layer of the plurality of layers being encrypted and enabling a highest level of play quality for the plurality of layers, wherein the first layer and the second layer have an identical duration and correspond to an identical time segment of the content stream;
play at least the first layer;
request access to at least one decryption key or license usable to enable access to at least the second layer while playing the first layer;
determine whether the at least one decryption key or license has been acquired;
continue to enable play of at least the first layer in response to determining that the decryption key or license has not been acquired after being requested;
use the at least one decryption key or license to decrypt at least the second layer to form a decrypted layer in response to determining that the at least one decryption key or license has been acquired;
combine at least the first layer with the decrypted layer to form a combined layer; and
transition play of the content stream to the higher quality level of play using the combined layer.

2. The client device of claim 1, wherein the one or more hardware processors:
determine a highest non-decrypting level of quality within the plurality of layers playable absent decrypting any of the layers; and
combine one or more of the layers at the highest non-decrypting level of quality for use in playing the content absent access to the at least one decryption key or license.

3. The client device of claim 2, wherein determining the highest non-decrypting level of quality further comprises determining a configuration of the client device, and using the configuration to further select a level of quality.

4. The client device of claim 1, wherein playing at least the first layer further comprises using a scalable compression/decompression (CODEC) component to combine one or more layers with the first layer to generate a level of quality for play that is higher than the first layer.

5. The client device of claim 1, wherein requesting access to the at least one decryption key or license further comprises requesting the at least one decryption key or license based on a key rotation point in the content stream, or a user requested seek to a different portion of the content stream for play.

6. A computer-based method operating on a computer device, comprising:
receiving a plurality of layers for a content stream, at least a first layer of the plurality of layers being unencrypted and enabling a lowest level of play quality for the plurality of layers, and at least a second layer of the plurality of layers being encrypted and enabling a highest level of play quality for the plurality of layers, wherein the first layer and the second layer have an identical duration and correspond to an identical time segment of the content stream;

playing, using a hardware processor, at least the first layer;

requesting access to at least one decryption key or license usable to enable access to at least the second layer while playing the first layer;

determining whether the at least one decryption key or license has been acquired;

continuing to enable play of at least the first layer in response to determining that the decryption key or license has not been acquired after being requested;

using the at least one decryption key or license to decrypt at least the second layer to form a decrypted layer in response to determining that the at least one decryption key or license has been acquired;

combining at least the first layer with the decrypted layer to form a combined layer; and transitioning play of the content stream to the higher quality level of play using the combined layer.

7. The computer-based method of claim 6, wherein continuing to enable play further comprises decreasing a level of quality of play while waiting for the at least one decryption key or license based on detecting a key rotation point in the content stream.

8. The computer-based method of claim 6, wherein playing the first layer further comprises selecting a highest non-decrypting quality of play available by combining layers in the plurality of layers, each layer being combined being received as an unencrypted layer, and combining the layers increases a quality level from the first layer.

9. The computer-based method of claim 6, wherein playing the first layer further comprises selecting a level of quality for play based on the received layers and a configuration of the computer device.

10. The computer-based method of claim 6, wherein requesting access to the at least one decryption key or license further comprises requesting the at least one decryption key or license based on a key rotation point in the content stream, or a user requested seek to a different portion of the content stream for play.

11. The computer-based method of claim 6, wherein playing at least the first layer further comprises using a scalable compression/decompression (CODEC) component to combine at least an unencrypted layer in the plurality of layers with the first layer to generate a level of quality for play that is higher than the first layer.

12. A non-transitory computer readable medium, having computer-executable instructions stored thereon, that in response to execution by a computing device, cause the computing device to perform operations, comprising:

receiving a plurality of layers for a content stream, at least a first layer of the plurality of layers being unencrypted and enabling a lowest level of play quality for the plurality of layers, and at least a second layer of the plurality of layers being encrypted and enabling a highest level of play quality for the plurality of layers, wherein the first layer and the second layer have an identical duration and correspond to an identical time segment of the content stream;

playing at least the first layer;

requesting access to at least one decryption key or license usable to enable access to at least the second layer while playing the first layer;

determining whether the at least one decryption key or license has been acquired;

continuing to enable play of at least the first layer in response to determining that the decryption key or license has not been acquired after being requested;

using the at least one decryption key or license to decrypt at least the second layer to form a decrypted layer in response to determining that the at least one decryption key or license has been acquired;

combining at least the first layer with the decrypted layer to form a combined layer; and transitioning play of the content stream to the higher quality level of play using the combined layer.

13. The non-transitory computer-readable medium of claim 12, wherein the computing device performs operations, further comprising:

determining a highest non-decrypting level of quality within the plurality of layers playable absent decrypting any of the layers; and combining one or more of the layers comprising the highest non-decrypting level of quality for use in playing the content absent access to the at least one decryption key or license.

14. The non-transitory computer-readable medium of claim 13, wherein determining the highest non-decrypting level of quality further comprises determining a configuration of the computing device, and using the configuration to further select a level of quality.

15. The non-transitory computer-readable medium of claim 12, wherein playing at least the first layer further comprises using a scalable compression/decompression (CODEC) component to combine at least an unencrypted layer in the plurality of layers with another layer having another level of quality to generate a level of quality for play that is higher than the first layer.

16. The non-transitory computer-readable medium of claim 12, wherein requesting access to the at least one decryption key or license further comprises requesting the at least one decryption key or license based on a key rotation point in the content stream, or a user requested seek to a different portion of the content stream for play.

17. The non-transitory computer-readable medium of claim 12, wherein levels of quality vary in at least one of a color, audio feature, or a dimensional feature of the content stream.

* * * * *